Sept. 7, 1937. R. B. MILLER 2,092,258
MOTOR WHEEL
Filed Dec. 8, 1927 2 Sheets-Sheet 1
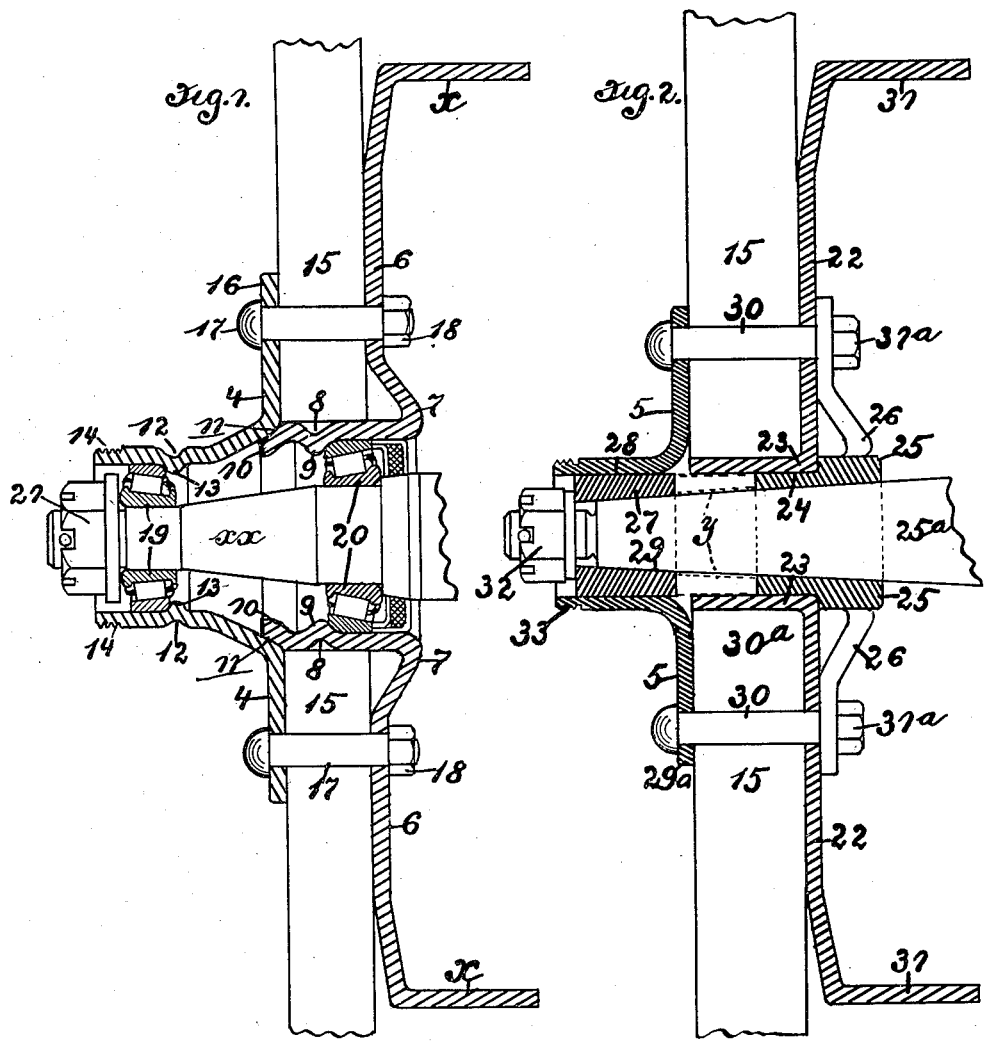
Inventor
Richard B. Miller

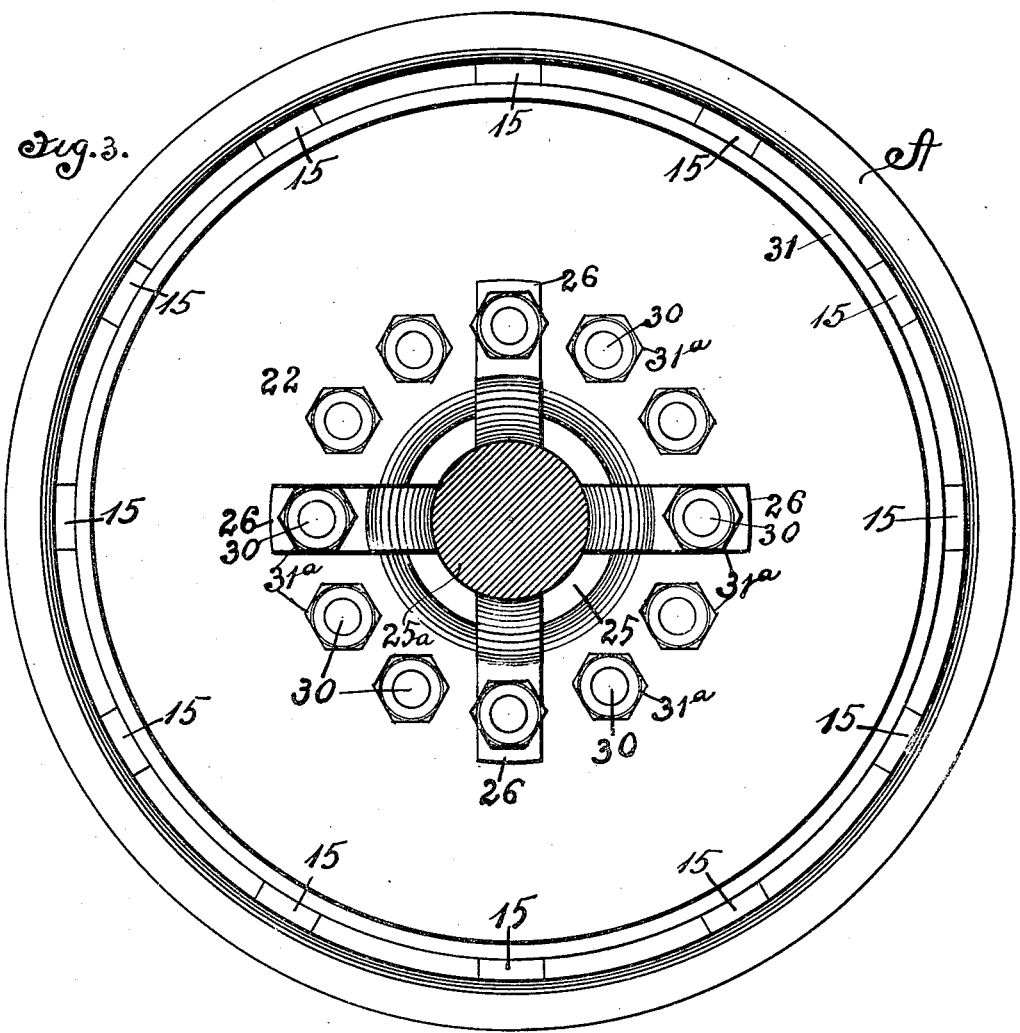

Patented Sept. 7, 1937

2,092,258

UNITED STATES PATENT OFFICE 2,092,258

MOTOR WHEEL

Richard B. Miller, Brooklyn, N. Y., assignor, by mesne assignments, to Bendix Products Corporation, South Bend, Ind., a corporation of Indiana Application December 8, 1927, Serial No. 238,638

6 Claims. (Cl. 301—6)

This invention relates to the type of wheels that include a two-piece hub and brake drum construction, the hub member being formed to carry a standard roller or bearing mechanism to cooperate with the standard spindle or axle of a vehicle, and the drum member being formed to carry also a standard roller or bearing mechanism to cooperate with the same spindle or axle of the vehicle and for operative engagement with braking mechanism thereof.

Some of the present wheel hubs are made of a casting or forging and the drum is made of a stamping, one being provided independently of the other. The bore of the completed hub member must be machined or polished in order to provide a smooth and true seating for the bearing mechanism, and both the hub and drum are then provided with apertures for rigidly securing the wheel spokes therewith. Because of the peculiar characteristics of the metal which is used in the process of stamping or drawing the parts, the flange of the drum member that is provided for contacting with the braking mechanism usually has so-called "high and low spots." Frequent squeaking is the result of the contacting of the braking mechanism against the peripheral flange surface having such "high and low spots" when a braking force is applied thereto.

Owing to the above defect in the formation of uneven surfaces on the flange, uneven wear and premature destruction of the lining of the braking mechanism often occur.

The combined cost of individual production of the hub and drum is higher than the cost of production of the respective hub and drum in one unit, whereby only one overhead item and one profit need be carried and the excessive weight when the members are manufactured individually is reduced considerably.

I have shown two wheel constructions, one being the front assembly and the other being the rear assembly, which are novel, light but strong and economical structures and which eliminate the hereinbefore described defects of some of the present wheel assemblies or constructions; and I produce a hub construction having means for retaining the standard bearing and driving mechanism of a vehicle. The costs of production is reduced to a minimum while at the same time either construction is adapted for use with several types of vehicle wheels.

With these and certain other objects in view, which will become apparent hereinafter, the invention is an improvement on the construction of my copending application, Serial No. 210,990, filed August 5, 1927.

In the drawings Fig. 1 is a cross section of a front wheel embodying my invention; Fig. 2 is a similar view of a rear wheel embodying my invention; while Fig. 3 is a side elevation of the rear wheel embodying the invention, showing the detail rear construction thereof.

In carrying out my invention I employ the standard number of spokes which may be of any necessary size to provide an artillery wheel; likewise I do not limit the embodiment of my invention to the artillery type construction exclusively, as I may employ the same with any wheel such as a disk or wire wheel. The wheel, as referred to in Fig. 1, comprises members 4 and 6 both securing the ordinary spokes in the manner hereinafter described. Member 6 constitutes the drum having the transversely extended flange X and swell 7 which continues to and merges with the transversely extended bore member, the member having the inrolled bead 8 to provide the inner stop 9 and the rolled-in-shoulder 10 which forms the inclined shoulder 11 for supporting member 4, as shown. Member 4 comprises a cup-shaped construction having an inrolled bead 12 to provide a stop 13 and an external thread 14 is formed on the outer portion thereof.

The hub member and the drum member of the wheel, as shown, can be formed by a stamping and spinning or rolling process whereby light metal can be used in the manufacture of the fundamental structure of the wheel. Likewise, by this process of manufacture and the use of cold rolled metal each member can be stamped, spun or rolled to any desired form in order to provide necessary strength and at the same time, provide a construction which is strong and has consumed less metal in pounds than many of the present constructions of the same specifications. The flange X of the drum member can be rolled or spun after the stamping operations, to doubly secure a smooth and true circular surface for contacting with braking mechanism of a motor vehicle wheel or other contrivance, and, likewise, the bore of each hub member and drum member can be subjected to the same rolling or spinning process in order to eliminate necessary machining and to provide a smooth and true circular surface for contacting with tapered or other bearing mechanism. The rolling or spinning of all the parts of the hub member or drum member can be accomplished at one continuous operation by means of having the member properly secured in a specially constructed jig. Although the method of manufacture of this construction has been described as stamping and spinning or rolling the hub member and drum member can be formed by malleable or steel castings to provide a strong construction, if desired.

With the manner of stamping, spinning or rolling the hub member and drum member, I assemble the wheel to have desired strength and at the same time, reduce the costs of production. As shown, the swell 7 and the transverse member with its rolled-in portions 8, 9, 10 and 11, form a cylindrical or tubular portion circumferentially merged with the drum member 6, providing a circumferential or arched structure having a central bore and being capable of supporting the spokes 15 and sustaining the external stress and driving strain imposed on the external parts of the wheel, which form permanent fixtures of the latter and which are herein not shown. The series of spokes 15 are circumferentially or radially positioned on the transverse arched member of the drum 6 in any desired manner, parallel with the outer surface of the drum, as best shown. To completely secure the spokes in a rigid position, I place the hub member 4, coaxial with member 6 and in face abutting relation with the series of spokes, having the portion 11 of member 4 seated on the inclined portion 10 of the drum member 6 so as to effect a wedging therebetween. By passing of the bolts 17 through the flange 16, spokes and the drum member and securing of the nuts 18 each upon one bolt, the parts are strongly secured one with another, and the construction of the wheel is completed.

As a result of the stamping and spinning or rolling and of the novel arrangement of the parts, a through bore, having an inner-side and an outer-side, is provided to accommodate the roller bearing mechanisms 19 and 20, and the stops 9 and 13 prevent inward and outward movement of the respective bearing mechanisms 9 and 13. By inserting of the spindle XX which is buckled to the axle of a motor vehicle, through the respective bearing mechanisms and being locked by the nut 21, the bearing mechanisms are normally secured each in its respective operative position, and the wheel structure as assembled and locked, affords a light but strong commodity for service in the most desired manner. As a whole, each part of the hub and drum members together with the associated members of the assembled wheel, contributes cooperating features which will withstand exertion or stress received by the wheel while revolving on the road under the weight of a vehicle.

Referring to Figures 2 and 3, I provide a rear wheel construction A of a type such that the features of embodiments and manner of arranging the parts provide also an economical and light but strong structure. As hereinbefore described, every part of this construction can be also produced by means of stamping and spinning or rolling process; or, if desired, by malleable or steel castings of the parts to provide a strong construction, or with the features embodied therein, a desired construction can be likewise produced wherein some parts are formed by stamping and spinning or rolling and some parts of malleable or steel castings, if desired.

As shown, the drum member in the present construction is adapted to be formed by a stamping and spinning or rolling process in the manner described in connection with Figure 1. The drum member is provided with the angle cylindrical member 23 seating on the depressed circular surface 24 of bushing 25 which may be of any form or length. The bushing 25 is provided with integral spaced radiating members 26, as clearly shown in Figure 3 and for the purpose hereinafter described. The axle 25a is shown tapered outwardly, and is placed in the bore of the bushing 25 so that the inclined surfaces of both symmetrically align one with another, and a considerable portion of the axle is outwardly extended. Another bushing 27 which may be of any form or length, but in this case is provided with an inclined surface 29 to correspond to and be snugly contacted with the inclined surface of the extended portion of the axle 25a is positioned on said axle, the inwardly correspondingly inclined surfaces of the respective bushings and axle being for the purpose hereinafter described. As is obvious, the bushing 27 may be extended inwardly towards the bushing 25 as indicated by the dotted lines Y, or the bushing 25 may be made shorter if desired. If desired, the bushing 27 may be formed of a malleable or steel casting together with the cup-shaped member 5 so as to provide, as a whole, one member of the form or shape as shown, but in the present case the bushing 27 is suitably fastened to the cup-shaped member 5 on the straight line shown at 28 to provide a united or integral member to serve the purpose hereinafter described, or, if desired, the bushing and member may be independently placed in their respective positions. The ends 30a of the series of spokes 15 are circumferentially positioned on the cylindrical member 23 of the drum 22 in any desired manner, in face abutting relation with the drum 22, as shown. To completely secure the spokes in a rigid position, the cup-shaped member 5 carrying the bushing 27 is aligned with the drum member, and the series of bolts 30 each passes through the flange 29a of the member 5, each spoke, the body of the drum, and through one of the radiating members 26 to be engaged with a nut 31a. By inserting of the axle 25a through the respective bushings 25 and 27 and being locked with the nut 32, as shown, the axle is strongly secured in desired position so that, owing to the tapered surfaces of the bushings and axle, and the engagement of the nut with the axle, the latter is prevented from inward and outward movement parallel to the axis. As it is old, it is unnecessary to describe the ordinary key inserted into a slot formed in the axle and bushing in order to key them together for preventing circumferential creeping of the axle in relation to the bore of the bushings and the wheels as a whole.

In the manner of constructing the parts and the manner of arranging one in relation with the other, I provide a rear wheel construction that can withstand all strain imposed thereupon while in driving motion of the vehicle with which the wheel is equipped. As shown, the radiating members 26 each extending from the bushing 25 and paralleling with the surface of the drum member 22, circumferentially provide, in combination with the cup-shaped member 5 bearing against the spokes, a strong engagement between the parts, the bolts and nuts holding the parts and locking the same for a solid and rigid alignment one with another. As in the case of the front wheel assembly, the flange 31 of the drum 22 can be also trued down by a spinning or rolling process.

It will be seen that I provide novel constructions which are inexpensively produced and it is understood that the designing of the parts thereof is not limited to the showing, as many substitutions, modifications and changes can be made, which fall within the spirit and scope of the claims.

The invention having been described, what I desire to secure by Letters Patent is:

1. In a wheel for motor vehicles, a drum member formed with a radially-extended web wall and a central transversely-outwardly extended cylindrical flange defining a hub bore, a bushing in said bore, radially projecting members formed on said bushing, a separate outboard hub member formed with a radially-extended flange and a complementary central transversely-outwardly extended cylindrical flange defining an extension of said bore, a bushing in said last bore, a wheel body clamped between said drum member and the radially-extended flange of said outboard hub member, and means connecting said outboard hub member, wheel body, drum member and radially projecting members in assembled relation.

2. In a wheel for motor vehicles, a drum member formed with a radially-extended web wall and a central transversely-outwardly extended cylindrical flange defining a hub bore, a bushing in said bore, radially projecting members formed on said bushing, a separate outboard hub member formed with a radially-extended cylindrical flange defining an extension of said bore, a bushing in said last bore, a wheel body clamped between said drum member and the radially-extended flange of said outboard hub member, and means connecting said outboard hub member, wheel body, drum member and radially projecting members in assembled relation, said bushing being formed with an annular stop shoulder which engages the inner end of the said cylindrical flange of the drum.

3. In a wheel for motor vehicles, a brake drum member formed with a radially-extended web wall and a central transversely-outwardly extended annular flange defining a hub bore, a bushing in said bore, radially extending members on said bushing aligned with the inboard side of said web wall for locking therewith, a separate outer hub member having radially extending means and a central transversely-outwardly extended annular flange defining an extension of said bore, a bushing in said last bore portion, said both bushings being adapted for engagement with an axle-shaft for driving the wheel, by power of a vehicle, a wheel body in association with said brake drum member and outboard hub member to complete the structure of the wheel, and means for fastening the assembled parts together.

4. In a combined wheel hub and brake drum-supporting structure, a nave body comprising the central portion of the structure formed of axially-extended and radially-aligned tubular sections, a bushing in each section together having a substantially aligned axle-retaining bore, a flange carried by and projecting radially from the outboard tubular section, a flange carried by and projecting from the other tubular section, means carried by and projecting radially from the inboard bushing, and means adapted for completing the structure for service with a vehicle.

5. In a wheel for motor vehicles, a brake-drum member formed with a web wall and a central transversely-outwardly extended tubular flange defining a hub bore, a separate outer hub member formed with a central transversely-outwardly extended tubular flange defining a hub bore and a radial flange extended from the inboard side thereof, the tubular flanges being substantially aligned to constitute substantially an axial hub body having substantially a continuous bore therein, a bushing in the bore of the outer hub member, a bushing in the bore of the tubular flange of the web wall, members radially extended from the inboard side of said last bushing in parallel alignment with the inboard-side face of the web wall, and means fastening the assembled parts to constitute a wheel structure adapted for service with a vehicle.

6. In a hub structure for a wheel, a central portion comprising a pair of hub plates each having a central nave portion formed with a bore, an axle-shaft bushing in each bore thereof adapted for driving engagement with an axle-shaft to revolve the wheel, and means adapted for completing the structure for service with a vehicle.

RICHARD B. MILLER.